United States Patent
Nabetani

(10) Patent No.: US 11,290,980 B2
(45) Date of Patent: Mar. 29, 2022

(54) ELECTRONIC APPARATUS AND WIRELESS COMMUNICATION METHOD

(71) Applicant: KABUSHIKI KAISHA TOSHIBA, Tokyo (JP)

(72) Inventor: Toshihisa Nabetani, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 244 days.

(21) Appl. No.: 16/122,532

(22) Filed: Sep. 5, 2018

(65) Prior Publication Data

US 2019/0281578 A1 Sep. 12, 2019

(30) Foreign Application Priority Data

Mar. 9, 2018 (JP) .............................. JP2018-043265

(51) Int. Cl.

| | |
|---|---|
| *H04W 64/00* | (2009.01) |
| *H04B 7/022* | (2017.01) |
| *B60T 7/12* | (2006.01) |
| *H04W 84/00* | (2009.01) |
| *B60T 17/22* | (2006.01) |
| *H04B 7/06* | (2006.01) |
| *B60T 13/66* | (2006.01) |
| *B60T 7/18* | (2006.01) |
| *B61L 25/02* | (2006.01) |
| *H04W 4/30* | (2018.01) |

(52) U.S. Cl.
CPC .......... *H04W 64/006* (2013.01); *B60T 7/126* (2013.01); *B60T 7/18* (2013.01); *B60T 13/665* (2013.01); *B60T 17/228* (2013.01); *H04B 7/022* (2013.01); *H04B 7/0695* (2013.01); *H04W 84/005* (2013.01); *B61L 25/028* (2013.01); *H04W 4/30* (2018.02)

(58) Field of Classification Search
CPC . H04W 64/006; H04W 24/02; H04W 84/005; H04B 7/022; H04B 7/0695; H01Q 3/00
See application file for complete search history.

(56) References Cited

U.S. PATENT DOCUMENTS

| | | | |
|---|---|---|---|
| 9,197,982 B2 * | 11/2015 | Moshfeghi | .......... H04B 17/336 |
| 9,419,690 B2 | 8/2016 | Okayama | |
| 10,111,108 B2 | 10/2018 | Shen et al. | |

(Continued)

FOREIGN PATENT DOCUMENTS

| | | |
|---|---|---|
| JP | H10-297488 A | 11/1998 |
| JP | 2015-119349 A | 6/2015 |
| WO | WO-2014/045806 A1 | 3/2014 |

*Primary Examiner* — Redentor Pasia
(74) *Attorney, Agent, or Firm* — Foley & Lardner LLP

(57) ABSTRACT

According to one embodiment, an electronic apparatus mounted on a moving object, includes at least one variable directivity antenna; controlling circuitry configured to acquire a traveling position of the moving object and determine an antenna pattern for the variable directivity antenna based on a location of a ground apparatus to be a communication target and the acquired traveling position; and a communication circuit configured to transmit positional information including the traveling position or receive control information from the ground apparatus via the variable directivity antenna for which the determined antenna pattern is set.

10 Claims, 9 Drawing Sheets

(56) References Cited

U.S. PATENT DOCUMENTS

| | | | |
|---|---|---|---|
| 10,259,477 B2* | 4/2019 | LeFebvre | B61L 15/0027 |
| 10,267,061 B2* | 4/2019 | Hage | G06Q 10/083 |
| 10,536,920 B1* | 1/2020 | Desclos | G01S 5/00 |
| 10,608,723 B2* | 3/2020 | Raghavan | H04B 7/065 |
| 10,713,613 B2* | 7/2020 | Hage | G01D 21/02 |
| 10,736,023 B2* | 8/2020 | Sun | H04W 24/02 |
| 10,742,287 B2* | 8/2020 | Ryu | H04W 64/003 |
| 2011/0032149 A1* | 2/2011 | Leabman | H01Q 1/246 |
| | | | 342/368 |
| 2013/0109327 A1* | 5/2013 | Matsumori | H04W 24/02 |
| | | | 455/73 |
| 2013/0260798 A1* | 10/2013 | Moshfeghi | H04W 4/029 |
| | | | 455/456.5 |
| 2015/0126173 A1* | 5/2015 | Dribinski | H01Q 3/00 |
| | | | 455/418 |
| 2017/0187426 A1 | 6/2017 | Su et al. | |
| 2017/0295595 A1* | 10/2017 | Yang | H04W 74/0816 |
| 2017/0317724 A1* | 11/2017 | Khandani | H01Q 19/28 |

* cited by examiner

| GROUND APPARATUS 1 | (a,b) |
|---|---|
| GROUND APPARATUS 2 | (c,d) |
| ⋮ | ⋮ |
| GROUND APPARATUS n | (y,z) |

FIG. 3

| TRAVELING POSITION a | ANTENNA PATTERN 1 |
|---|---|
| TRAVELING POSITION b | ANTENNA PATTERN 2 |
| ⋮ | ⋮ |
| TRAVELING POSITION z | ANTENNA PATTERN n |

FIG. 5

ELECTRONIC APPARATUS AND WIRELESS COMMUNICATION METHOD

CROSS REFERENCE TO RELATED APPLICATIONS

This application is based upon and claims the benefit of priority from the prior Japanese Patent Application No. 2018-043265, filed on Mar. 9, 2018, the entire contents of which are incorporated herein by reference.

FIELD

Embodiments of the present invention relate to an electronic apparatus and a wireless communication method.

BACKGROUND

A train control system prevents occurrence of dangerous conditions in driving a train so that the train can safely travel. Examples of the dangerous conditions include a driver of a train missing a signal and the like. An automatic train stop (ATS) system is known in which a brake of a train is caused to automatically operate according to a distance from a preceding train to stop the train. Further, an automatic train control (ATC) system is known in which a speed is automatically decelerated to be equal to or below a signal indication.

In these train control systems, speed control based on fixed blocking is performed in which control is performed such that two trains do not exist at the same time in a specified block section. Therefore, a train cannot move forward more unless a distance from a preceding train is set to at least a block section length or more. However, the block section length is determined according to a vehicle with the worst braking performance from a viewpoint of safety. Therefore, a vehicle with good braking performance cannot make use of the original performance of the vehicle to operate. Recently, there has been a great demand for high-speed and high-density operation. However, the train control system based on fixed blocking cannot respond to diverse vehicle performances or shorten the distance from a preceding vehicle. Therefore, it is difficult to realize high-speed/high-density operation.

Therefore, instead of the conventional train control system based on fixed blocking, a train control system based on moving blocking using wireless communication is proposed. In the moving blocking type train control system using wireless communication, stop (or deceleration) limit information defined by a position of a preceding train or existence of a speed limit section is transmitted from a ground apparatus to a train using wireless communication. In the train, its own braking pattern is created in consideration of vehicle performances of the train or railroad line gradients based on the information, and speed control of the train is performed based on the created braking pattern. Therefore, the necessity to secure the distance from a preceding train more than necessary is eliminated. Therefore, in comparison with ATS and ATC, higher speed/higher density operation is expected.

As a method for improving reliability of communication quality of wireless communication between an on-vehicle apparatus and a ground apparatuses arranged along a railroad track (such as a railroad line) in the train control system using wireless communication, it is proposed to use selection diversity of selecting an antenna with the best reception condition from among a plurality of antennas or time diversity of transmitting the same information (telegram) a plurality of times. In the selection diversity, however, the number of antennas increases. The number of antennas that can be installed is limited from viewpoints of installation restrictions and costs. Further, the time diversity leads to increase in an amount of traffic in wireless communication.

SUMMARY

According to one embodiment, an electronic apparatus mountable on a moving object, and communicable with a ground apparatus, includes: at least one variable directivity antenna; controlling circuitry configured to acquire a traveling position of the moving object and determine a first antenna pattern of the variable directivity antenna based on a location of the ground apparatus and the traveling position; and communication circuitry configured to: set the first antenna pattern to the variable directivity antenna; and transmit positional information including the traveling position or receive control information used to control the moving object from the ground apparatus via the first antenna pattern of the variable directivity antenna.

BRIEF DESCRIPTION OF THE DRAWINGS

FIG. 3 is a diagram showing an example of a database held by the on-vehicle apparatus of the embodiment of the present invention;

FIG. 5 is a diagram showing another example of the database held by the on-vehicle apparatus of the embodiment of the present invention;

DETAILED DESCRIPTION

An embodiment of the present invention will be described below with reference to drawings.

Figure 1:
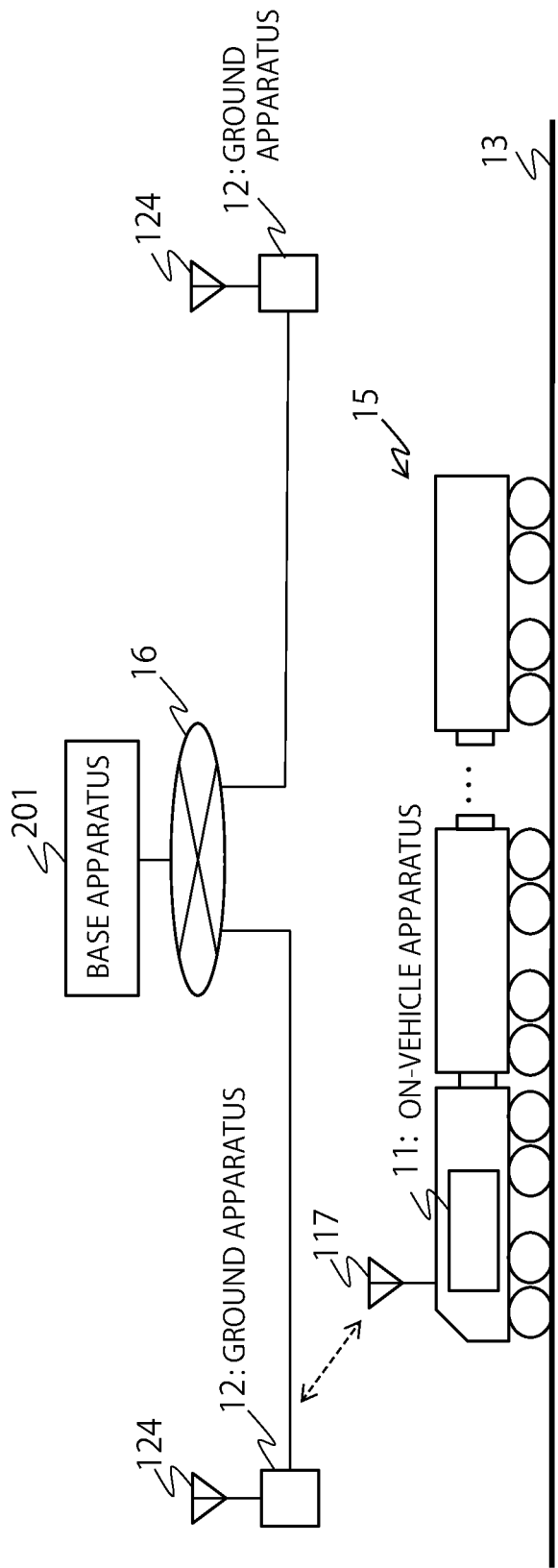
FIG. 1 is an overall block diagram of a train control system of an embodiment of the present invention.

FIG. 1 shows an overall block diagram of a train control system of an embodiment of the present invention. The train control system of FIG. 1 is provided with a plurality of ground apparatuses (electronic apparatuses) 12 and an on-vehicle apparatus (an electronic apparatus) 11 equipped on a train 15 traveling on a railroad track 13 such as a railroad line. The train 15 is configured by coupling of one or more cars. Though the present embodiment deals with a case where a train is a control target, similar implementation is possible for other moving objects such as an automobile. Further, the control target is not limited to moving objects moving on the ground, but similar implementation is possible for moving objects moving in places other than the ground, such as drones. The moving objects include at least a train, an automobile and drones as one example. Below, it is assumed that the moving object is a train which is one example of a vehicle.

The plurality of ground apparatuses 12 are arranged along the railroad track 13. The ground apparatuses 12 are located, for example, on upper parts of poles standing on the ground. The ground apparatuses 12 are connected to a base apparatus 201 via a communication network 16. Though the communication network 16 is a wired network as an example, it may be a wireless network. The base apparatus 201 performs management of the plurality of ground apparatuses 12 and control and monitoring of each train. On the railroad track 13, a train 15 is traveling to the left (a forward direction) on the drawing. The train 15 is mounted with the on-vehicle apparatus 11 that performs braking control of the train 15. The ground apparatuses 12 are provided with antennas 124, respectively, and the on-vehicle apparatus 11 is provided with an antenna 117. The on-vehicle apparatus 11 and the ground apparatuses 12 mutually exchange information via the antenna 117 and the antennas 124. For the exchange of information, an arbitrary wireless communication scheme can be used. In the present embodiment, an IEEE802.11 wireless LAN (Local Area Network) is used. That is, the on-vehicle apparatus 11 of each train and each ground apparatus 12 transmit information after acquiring a transmission right in accordance with a CSMA/CA (Carrier Sense Multiple Access/Collision Avoidance) scheme as an access control scheme. In this case, the ground apparatus 12 operates as an access point (AP), and the on-vehicle apparatus 11 operates as a station (STA) as an example.

Figure 2:
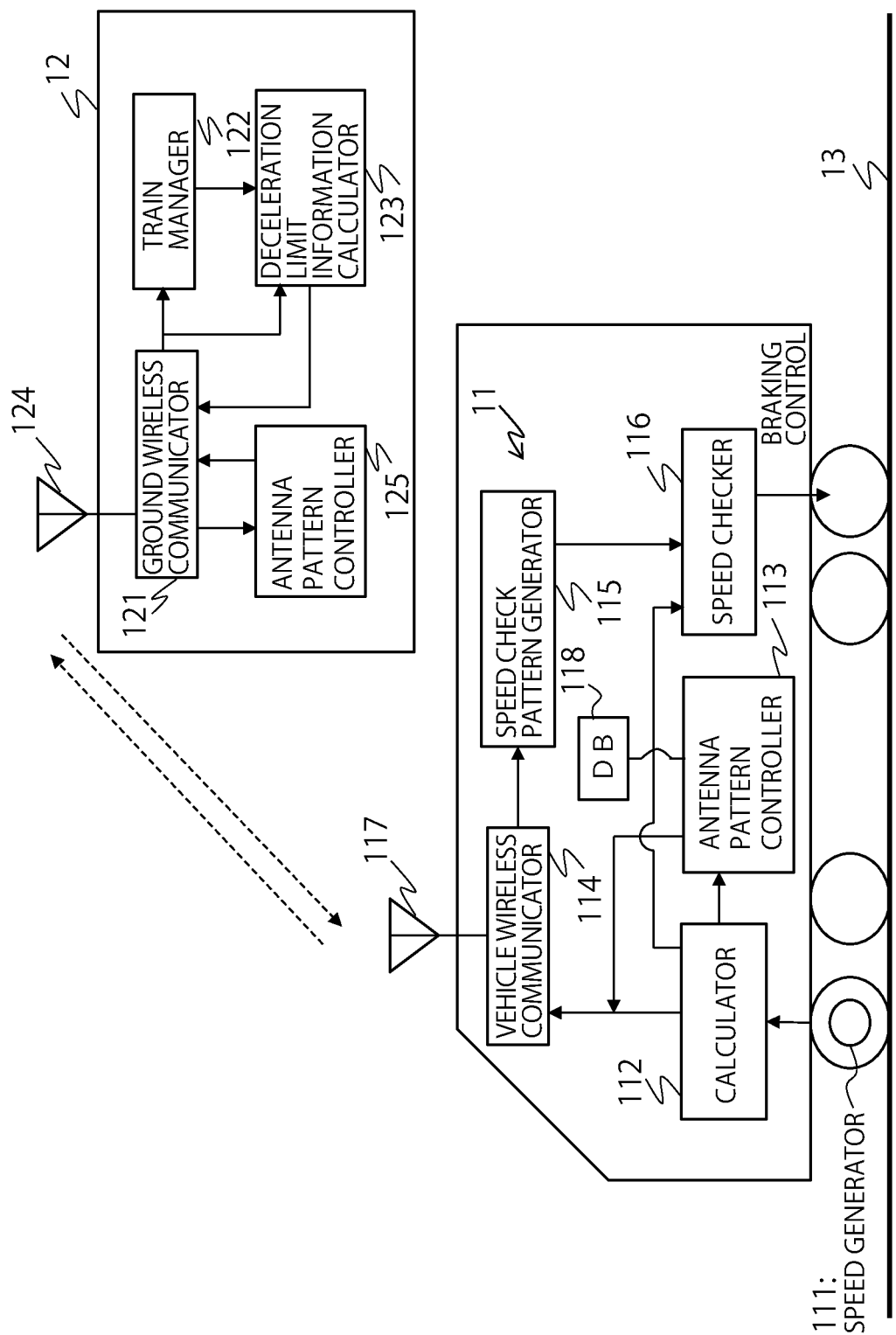
FIG. 2 is a block diagram of a ground apparatus and an on-vehicle apparatus of the embodiment of the present invention.

FIG. 2 shows a block diagram of the on-vehicle apparatus 11 and the ground apparatus 12. Though only one ground apparatus 12 is shown here, the other ground apparatuses 12 have the same configuration. Though only one on-vehicle apparatus 11 is shown also, the on-vehicle apparatuses 11 of other trains have the same configuration.

The ground apparatus 12 is provided with a ground wireless communicator (communication circuitry) 121, a train manager 122, a deceleration limit information calculator 123, the antenna 124 and an antenna pattern controller 125. The train manager 122, the deceleration limit formation calculator 123 and the antenna pattern controller 125 correspond to controlling circuitry as one example. A configuration is also possible in which functions of the train managers 122 and the deceleration limit information calculators 123 of the plurality of ground apparatuses 12 are collected to the base apparatus 201, and the train managers 122 and the deceleration limit information calculators 123 of the plurality of ground apparatuses 12 are omitted.

The on-vehicle apparatus 11 is provided with an calculator 112, an antenna pattern controller 113, a vehicle wireless communicator (communication circuitry) 114, a speed check pattern generator 115, a speed checker 116, the antenna 117 and a database (a DB) 118. A speed generator 111 is coupled with a wheel of the train. The calculator 112, the antenna pattern controller 113, the speed check pattern generator 115 and the speed checker 116 corresponds to controlling circuitry as one example.

The antenna 117 of the on-vehicle apparatus 11 is a variable directivity antenna. The number of antennas 117 may be one or more. Further, each antenna 117 may be configured as a transmitting antenna or a receiving antenna or may be configured as an antenna for both of transmission and reception.

The antenna pattern controller 113 controls an antenna pattern for the antennas 117. The antenna pattern controller 113 selects an optimal or preferable antenna pattern from among a plurality of directional antenna patterns and controls the antenna 117 so that information can be transmitted and received with the selected antenna pattern.

Any configuration is possible as a configuration of a variable directivity antenna. As an example, the antenna may be configured by forming a plurality of slots on a conductive substrate and providing a plurality of switch elements for switching whether or not to short each slot. For example, if each slot is rectangular, mutually facing long sides of the rectangular slot are connected by a switch element. The directivity of the antenna can be variable by combination of on/off of the switch element. To short the slot means to connect mutually facing the long sides of the slot via the slot, for example, by turning on the switch. The configuration of the variable directivity antenna stated here is a mere example, and other configurations are also possible.

The speed generator 111 detects the number of rotations of the wheel and generates a speed pulse.

The calculator 112 of the on-vehicle apparatus 11 receives the speed pulse from the speed generator 111 and calculates a traveling speed and a traveling position of its own train by arithmetic operation at regular time intervals. Though both of the traveling speed and traveling position of the train are calculated here, a configuration is also possible in which only the traveling position is calculated. A method for calculating the traveling speed and the traveling position is not limited to the method using the speed generator 111. For example, a calculation method using the GPS is also possible. The traveling position may be periodically corrected using a track antenna located on the railroad track 13. Even if a traveling position error occurs due to wheel slip when using only a speed pulse from the speed generator 111, the traveling position can be calculated with high accuracy by performing correction using a track antenna. Thus, the calculator 112 acquires the traveling position of the train, the traveling speed of the train or both of them by an arbitrary method using the speed generator 111, the GPS or the like.

The vehicle wireless communicator 114 generates train information (vehicle information or positional information) that includes information about the traveling position/traveling speed information obtained by the calculator 112 and detailed information about its own train. Examples of the detailed information about the train include a vehicle length, an antenna location (or installed position), train identification information and the like, but the detailed information is not limited thereto. Here, as a format of information, a frame is generated in a particular format. The vehicle wireless communicator 114 performs necessary processing, such as modulation processing, D/A conversion and frequency conversion, to a predetermined frequency band for the generated frame to generate a wireless signal. A destination address of the frame may be a broadcast address or a multicast address. If a communication target ground apparatus 12 can be identified, a unicast address (a MAC address of the ground apparatus 12) may be used. A transmission source address is a MAC address of the on-vehicle apparatus 11. The vehicle wireless communicator 114 transmits the generated wireless signal to the ground apparatus 12 via the antenna 117. The antenna pattern controller 113 selects an optimal or preferable antenna pattern each time performing transmission to a ground apparatus 12; and the vehicle wireless communicator 114 transmits a wireless signal with the selected antenna pattern. An antenna pattern selection method will be described later.

A cycle for the vehicle wireless communicator 114 to transmit train information or a frame to the ground apparatus 12 (for example, every second, every ten seconds, every minute or the like) is set in advance as system information. Each train transmits information to the ground apparatus 12 according to this cycle. The cycle may be changed by each ground apparatus 12 setting a cycle according to a situation and notifying each train of the set cycle. Further, the on-vehicle apparatus 11 itself may change the cycle each time according to a situation and transmit the cycle.

The antenna 124 of the ground apparatus 12 is a variable directivity antenna similarly to the on-vehicle apparatus 11. Since a configuration of the antennas 124 is similar to that of the antennas 117 of the on-vehicle apparatus 11, description will be omitted.

The antenna pattern controller 125 of the ground apparatus 12 controls an antenna pattern for the antenna 124. As an example, the antenna pattern controller 125 selects an optimal or preferable antenna pattern from among a plurality of directional antenna patterns having directivity and controls the antenna 124 so that information can be transmitted and received with the selected antenna pattern. An antenna pattern selection method will be described later.

The ground wireless communicator 121 of the ground apparatus 12 receives a wireless signal transmitted from the on-vehicle apparatus 11 of each train existing on the railroad track 13 at a specified cycle via the antenna 124. The ground wireless communicator 121 performs demodulation processing for the received wireless signal after performing necessary processing such as frequency conversion to a baseband and A/D conversion. Thereby, train information about each train (traveling position/traveling speed information and the like) is obtained. The ground wireless communicator 121 provides the train information about each train to the train manager 122.

The train manager 122 of the ground apparatus 12 manages a position of each train existing on the railroad track 13 (train tracking). Each time the train manager 122 receives new train information (traveling position/traveling speed information and the like) about each train from the ground wireless communicator 121, the train manager 122 updates traveling position/traveling speed information and the like about the train.

Each time receiving a signal (traveling position/traveling speed information and the like) from each train, the deceleration limit information calculator 123 of the ground apparatus 12 calculates a deceleration target speed, and a deceleration target position or a deceleration target distance allowed to reach the deceleration target speed, for the train. Hereinafter, a combination of the deceleration target speed, and the deceleration target position or the deceleration target distance will be called "deceleration limit information".

More specifically, for a target train, the deceleration limit information calculator 123 calculates the deceleration limit information by performing operation until which position (point) the target train is required to reach the deceleration target speed, based on an end position of a preceding train managed by the train manager 122 and a position of the target train, a speed limit value and the like. As the deceleration target speed, 0 km/h is often used.

The deceleration limit information is an example of train control information (vehicle control information or control information) for controlling a speed of a train. Though the deceleration limit information is used to control a speed of a train in the present embodiment, the train control information may be other information. For example, the train control information may be information indicating a deceleration target speed for a train and time allowed to reach the deceleration target speed.

The ground wireless communicator 121 of the ground apparatus 12 generates a frame that includes the deceleration limit information calculated by the deceleration limit information calculator 123 in a particular format. The ground wireless communicator 121 performs necessary processing, such as modulation processing, D/A conversion and frequency conversion to a predetermined frequency band, for the generated frame to generate a wireless signal, and transmits the generated wireless signal to the train via the antenna 124. The antenna pattern controller 125 selects an optimal or preferable antenna pattern each time performing transmission to the on-vehicle apparatus 11 of each train; and the ground wireless communicator 121 transmits a wireless signal with the selected antenna pattern. An antenna pattern selection method will be described later. Thus, the ground apparatus 12 repeats reception of train information (traveling position/traveling speed information and the like) and transmission of deceleration limit information with the on-vehicle apparatus 11 of each train at each cycle.

After transmitting the train information (the traveling position/traveling speed information and the like) to the ground apparatus 12, the on-vehicle apparatus 11 receives deceleration limit information about its own train from the ground apparatus 12 via the antenna 117 and the vehicle wireless communicator 114. The on-vehicle apparatus 11 receives the signal from the ground apparatus 12 with an optimal or preferable antenna pattern selected by the antenna pattern controller 113. An antenna pattern selection method will be described later.

The speed check pattern generator 115 of the on-vehicle apparatus 11 creates a speed check pattern for performing control to decrease a speed to a deceleration target speed without crossing a deceleration target position notified from the ground apparatus 12 (deceleration control) in consideration of vehicle performance (for example, braking performance) of its own train. The speed check pattern is a speed control pattern for causing a speed to decrease up to a deceleration target speed step by step before reaching a deceleration target position. As an example, the speed check pattern is configured as a graph in which a remaining distance to a deceleration target position and a limit speed allowed at that point of time are associated. As the remaining distance is shorter, the allowed limit speed is lower. Alternatively, the speed check pattern may be configured in such a manner that a section to a target position is divided in a plurality positions, and, for each divided position, a gradually decreasing speed (a limit speed allowed at that point of time) is specified. The speed check pattern generator 115 may calculate the speed check pattern additionally using a database that includes a gradient for each section of a traveling route, and the like in addition to the vehicle performance of the train. Thereby, it becomes possible to create a speed check pattern with a high accuracy.

Based on the created speed check pattern and a current traveling position and traveling speed of its own train, the speed checker 116 judges whether the traveling speed exceeds a speed allowed by the speed check pattern (a limit speed). To make such a judgment is referred to as a speed check. If the traveling speed exceeds the speed allowed by the speed check pattern, the speed checker 116 outputs a braking command to a braking controller not shown. Braking control is performed by the braking controller in accordance with the braking command.

By performing braking control according to a speed check pattern, speed control of causing a speed to decrease to a deceleration target speed without crossing a deceleration target position (that is, before reaching the deceleration target position) becomes possible in each train.

Though the on-vehicle apparatus 11 calculates a speed check pattern in the present embodiment, the ground apparatus 12 may calculate a speed check pattern for each train. In this case, the ground apparatus 12 is provided with a storage for storing vehicle performance of each train and the speed check pattern generator 115, and the speed check pattern generator 115 calculates the speed check pattern for each train using the vehicle performance of the train. The ground apparatus 12 wirelessly transmits the calculated speed check pattern to the on-vehicle apparatus 11 of each train. The vehicle wireless communicator 114 of the on-vehicle apparatus 11 of each train performs speed check based on the speed check pattern received from the ground apparatus 12.

Thus, for each train, a speed check pattern is updated at each specified cycle based on a traveling position of each train, and speed control is performed according to an updated braking pattern.

(Antenna Pattern Control in On-Vehicle Apparatus 11)

Next, antenna pattern control for the antenna 117 in the on-vehicle apparatus 11 will be described. Basically, the antenna pattern controller 113 determines an antenna pattern according to a traveling position of its own train calculated by the calculator 112. More specifically, an antenna pattern with the highest antenna gain in a direction from the traveling position of the train to a ground apparatus 12 to communicate with (that is, such an antenna pattern that a direction of directivity matches the direction toward the ground apparatus 12 most) is determined. Since the traveling position of the train changes with time, an appropriate antenna pattern is selected at each point of time. An antenna pattern determination method in the antenna pattern controller 113 will be described below in more detail.

The database 118 holds information required to determine an antenna pattern. As an example, the database 118 holds information about a location (installed position) of each of the ground apparatuses 12 arranged along the railroad track 13. FIG. 3 shows an example of the database 118. For a ground apparatus 1, a ground apparatus 2, . . . , a ground apparatus n, their respective positions (a, b), (c, d), . . . , (y, z) are held. Though the positions are two-dimensionally expressed here, the positions may be three-dimensionally expressed in consideration of height. Storage of information into the database 118 may be performed in advance, for example, at the time of shipment. Alternatively, the on-vehicle apparatus 11 may receive location information about each ground apparatus 12 from the ground apparatus 12 and store the received location information into the database 118. Further, it is also possible to acquire the location information about each ground apparatus 12 in other methods and store the acquired location information into the database 118.

The antenna pattern controller 113 of the on-vehicle apparatus 11 identifies a ground apparatus 12 to communicate with, from the held location about each ground apparatus 12 and a traveling position of its own train and determines such an antenna pattern that the highest gain is directly obtained in a direction toward the ground apparatus 12. The ground apparatus 12 to communicate with is, for example, a ground apparatus 12 that is the nearest from the traveling position. Alternatively, a database in which a ground apparatus 12 to communicate with is defined in advance for each traveling position may be prepared to identify the ground apparatus 12 to communicate with, based on the traveling position and the database.

Figure 4A:
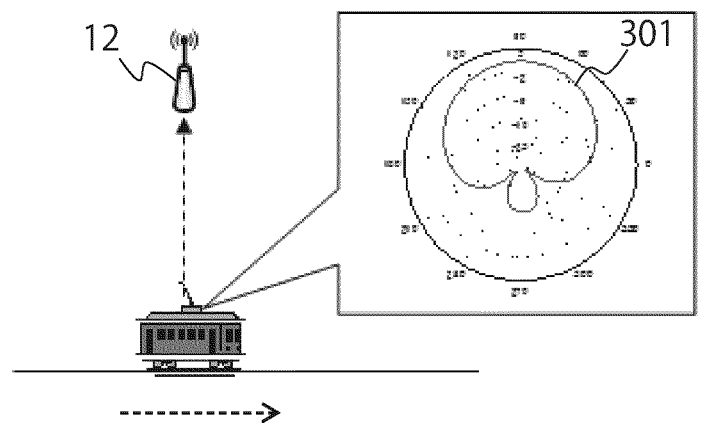
FIGS. 4A and 4B show examples of an antenna pattern determined by the on-vehicle apparatus of the embodiment of the present invention.
Figure 4B:
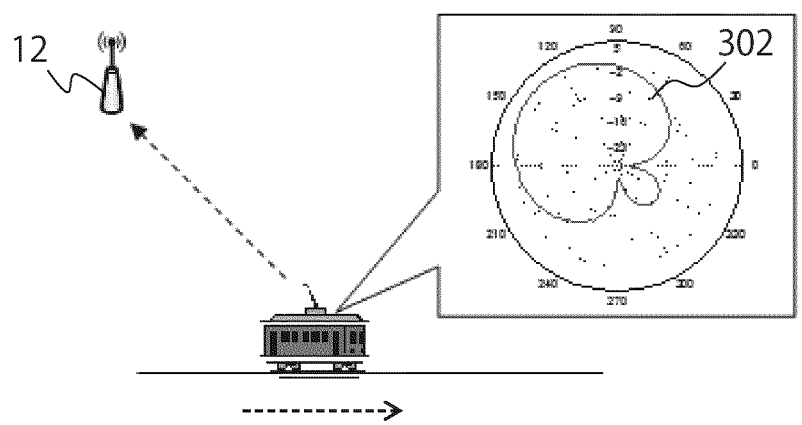

FIGS. 4A and 4B show specific examples of selection of an antenna pattern. FIG. 4A shows an example in which a train is traveling right beside a ground apparatus 12. The antenna pattern controller 113 of the on-vehicle apparatus 11 determines an antenna pattern to be used for communication with the ground apparatus 12 based on a relationship between a traveling position of its own train and a location of the ground apparatus 12 at this timing (the traveling position). Specifically, the on-vehicle apparatus 11 selects an antenna pattern with the highest directivity relative to the ground apparatus 12 from among a plurality of antenna patterns. Here, an antenna pattern 301 shown in FIG. 4A is selected.

The antenna pattern controller 113 switches the antenna pattern for the antenna 117 to the selected antenna pattern 301. The vehicle wireless communicator 114 performs transmission/reception (transmission of train information, reception of deceleration limit information, and the like) with the ground apparatus 12 with the switched antenna pattern 301.

FIG. 4B shows a case where a ground apparatus 12 is located diagonally behind a train. The on-vehicle apparatus 11 selects an antenna pattern with the highest directivity relative to the ground apparatus 12 in a manner similar to the manner in the case of FIG. 4A. Here, an antenna pattern 302 shown in FIG. 4B is selected. The on-vehicle apparatus 11 switches the antenna pattern for the antenna 117 to the selected antenna pattern 302. The on-vehicle apparatus 11 performs transmission/reception with the ground apparatus 12 with the switched antenna pattern 302.

Thus, the on-vehicle apparatus 11 switches the antenna pattern each time communication is performed, based on a positional relationship between a traveling position of its own train and a position of a ground apparatus 12 held in the database 118. Thereby, it is possible to perform communication, with an antenna pattern with the highest antenna gain in a direction toward the ground apparatus 12.

As a modification, an antenna pattern corresponding to each traveling position may be calculated in advance, from a location of each ground apparatus 12 to hold the antenna pattern corresponding to each traveling position in the database 118. The on-vehicle apparatus 11 may determine an antenna pattern from a traveling position, using this database 118.

FIG. 5 shows an example of the database 118 holding an antenna pattern corresponding to each traveling position. For a traveling position a, a traveling position b, . . . , a traveling position z, an antenna pattern 1, an antenna pattern 2, . . . , an antenna pattern n with which the highest antenna gain can be obtained are held, respectively. At the time of communicating with a ground apparatus 12, the antenna pattern controller 113 selects an antenna pattern corresponding to a traveling position of its own train from the database 118. As a specific operation example, the antenna pattern controller 113 selects a traveling position that matches or is the closest to the traveling position of the train and selects an antenna pattern corresponding to the selected traveling position.

If there are a plurality of antennas 117, the antennas 117 may be mounted on a forward car and a backward car.

Figure 6:
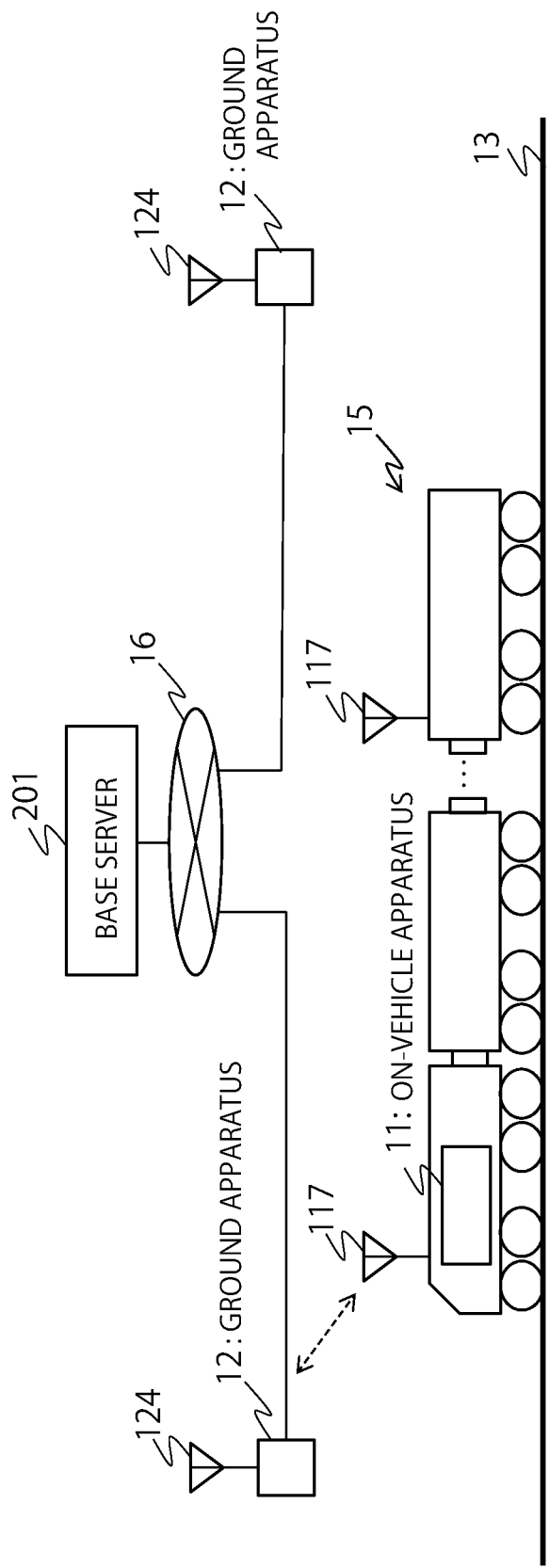
FIG. 6 is a diagram showing an example in which a plurality of antennas are located on mutually different cars.

FIG. 6 shows an example in which two antennas 117 are mounted on a forward car and a backward car. In this example, the forward car is a head car, and the backward car is a last car. However, the forward car may be a car after the head car (for example, the second car), and the backward car may be a car before the last car (for example, the second car from the last car). If the antennas 117 are located on a forward car and a backward car, the antenna pattern controller 113 controls antenna patterns for both the antennas 117 located on the forward car and the backward car. The antenna pattern controller 113 holds information indicating places where both antennas 117 are located beforehand. This information may be stored in a storage such as a memory that is accessible from the antenna pattern controller 113 or may be stored in an internal buffer of the antenna pattern controller 113. The vehicle wireless communicator 114 may be provided in common so that signals are inputted/outputted from both antennas 117. Alternatively, the vehicle wireless communicator 114 may be mounted on each of the forward and backward cars according to arrangement of both antennas 117.

The antenna pattern controller 113 identifies positions (traveling positions) of both antennas 117 based on information about a traveling position of the train obtained by the calculator 112. The antenna pattern controller 113 determines an antenna pattern for each antenna 117 based on the policy stated above, according to the identified positions (traveling positions) of both antennas 117. Since the antennas 117 of the forward car and the backward car are different in positional relationships with the ground apparatus 12, antenna patterns to be applied may be mutually different. Especially, if a car length is long, and a distance between the forward car and the backward car is large, the above case easily occurs. Further, antennas 117 may be located at positions other than the forward car and the backward car. In this case also, an antenna pattern for each antenna 117 can be controlled with a similar idea.

Further, even in the case of the antenna 117 being located only at one position, if a traveling position calculated by the calculator 112 and a location of the antenna 117 are largely different from each other, the traveling position of the train can be corrected according to the location of the antenna 117, and an antenna pattern can be determined based on the corrected traveling position. For example, there may be a case where the traveling position is calculated with a position of the speed generator 111 or a head car as a reference, and the antenna 117 is arranged on a backward car, and the like.

(Modification of Antenna Pattern Control)

[1] Basically, communication performance is improved most by selecting an antenna pattern with the highest directivity (with a high gain) in a direction toward a ground apparatus 12 as described above. However, because of reflection of radio waves and the like, the antenna pattern with the highest directivity in a direction toward a ground apparatus 12 does not necessarily show the best characteristics. Therefore, an antenna pattern showing the best characteristics at each traveling position is identified by measurement in advance by an evaluation survey, and the identified pattern is held in a database being associated with the traveling position. The antenna pattern controller 113 selects an antenna pattern corresponding to a traveling position from this database. For example, an antenna pattern corresponding to a traveling position that is the same or the nearest to a current traveling position is selected from the database.

[2] Further, there are places where a degree of congestion of passengers differs depending on operation hours, such as commuting rush hours and daytime hours, and a radio wave environment (a radio wave reflection situation) differs accordingly. For example, a platform of a station and an area around the platform corresponds to such a place. Further, there is a possibility that the radio wave environment changes depending on operational seasons, such as a season for entrance into school and a summer vacation. Furthermore, there is a possibility that the radio wave environment changes depending on whether weather is good or bad. Therefore, a plurality of such databases as described in [1] above may be provided for operation conditions (operation time zones, operational seasons, weather and the like), respectively. In this case, a database to be used can be switched according to the operation conditions.

[3] In the case of determining an antenna pattern from a positional relationship between a traveling position of a train and a location of a ground apparatus 12 (see FIG. 3) also, an antenna pattern that shows the highest gain in a direction toward the ground apparatus 12 is not necessarily an antenna that shows the best characteristics. Therefore, a combination of a coordinate relationship (a traveling position and a location), an antenna pattern making the characteristics the best, and operation conditions are acquired as a sample by an evaluation survey. From a plurality of samples, a model of outputting an antenna pattern to show the best characteristics is generated by machine learning or the like, with the coordinate relationship and the operation conditions as input parameters. An antenna pattern is determined using the generated model. Anything such as a multi-regression model, a neural network and a decision tree, is possible as the model.

[4] A method is also possible in which, according to communication quality information such as received power and a packet error rate at the time of receiving a wireless signal transmitted from a ground apparatus 12, the antenna pattern controller 113 corrects an antenna pattern to be applied at the time of traveling through the same position or a position in the same range (for example, the same section in the case of dividing the railroad track 13 into a plurality of sections in advance) the next and subsequent times. For example, rules are created in advance such as a rule that, if a received power value is below a threshold, such an antenna pattern that a direction of directivity is shifted to the side (clockwise or counterclockwise) by a predetermined amount is obtained by correcting an antenna pattern selected by the above method, and an antenna pattern can be corrected in accordance with the rules. The communication quality information is not limited to received power or a packet error rate, and anything is possible if it is information related to communication quality.

It is also possible for the on-vehicle apparatus 11 to get the ground apparatus 12 to feedback communication quality information for information transmitted to the ground apparatus 12, and correct an antenna pattern using the feedback communication quality information. The feedback of the communication quality information may be performed, for example, at the same time when the ground apparatus 12 feeds back information (for example, deceleration limit information) to the on-vehicle apparatus 11.

(Antenna Pattern Control in Ground Apparatus 12)

Antenna pattern control for the antenna 124 in the ground apparatus 12 will be described. The basic operation of determining an antenna pattern according to a positional relationship between a traveling position of a train and a position of the ground apparatus 12 is the same as that of the on-vehicle apparatus 11. A significantly different point is that, while, in the on-vehicle apparatus 11, a traveling position of its own train is grasped by the calculator 112, it may be necessary to get a traveling position of each train to be notified because each train moves at any time, in the ground apparatus 12. Therefore, in the antenna pattern controller 125 of the ground apparatus 12, such an antenna pattern that the highest gain is obtained in a direction toward each train is determined according to a location of the ground apparatus 12 and a traveling position notified from the train, and the determined antenna pattern is applied to the antenna 124 to perform wireless communication (transmission/reception) with the train.

Similarly to the on-vehicle apparatus 11, optimal or preferable antenna patterns may be held in a database (see FIG. 5) beforehand according to traveling positions of a train. Further, it is also possible to correct an antenna pattern according to operation conditions (for example, operation time, operational seasons, weather and the like) of each train and communication quality (for example, received power or a packet error rate) from the on-vehicle apparatus 11 of each train, similarly to the case of the on-vehicle apparatus 11. Further, in the case where correction of an antenna pattern is performed according to communication quality, it is possible to use communication quality of communication with a certain train to correct an antenna pattern to be used for communication when the same or another train travels through the same position or a position in the same range (for example, the same section in a case where the railroad track 13 is divided into a plurality of sections beforehand) at the next or subsequent times.

Figure 7:
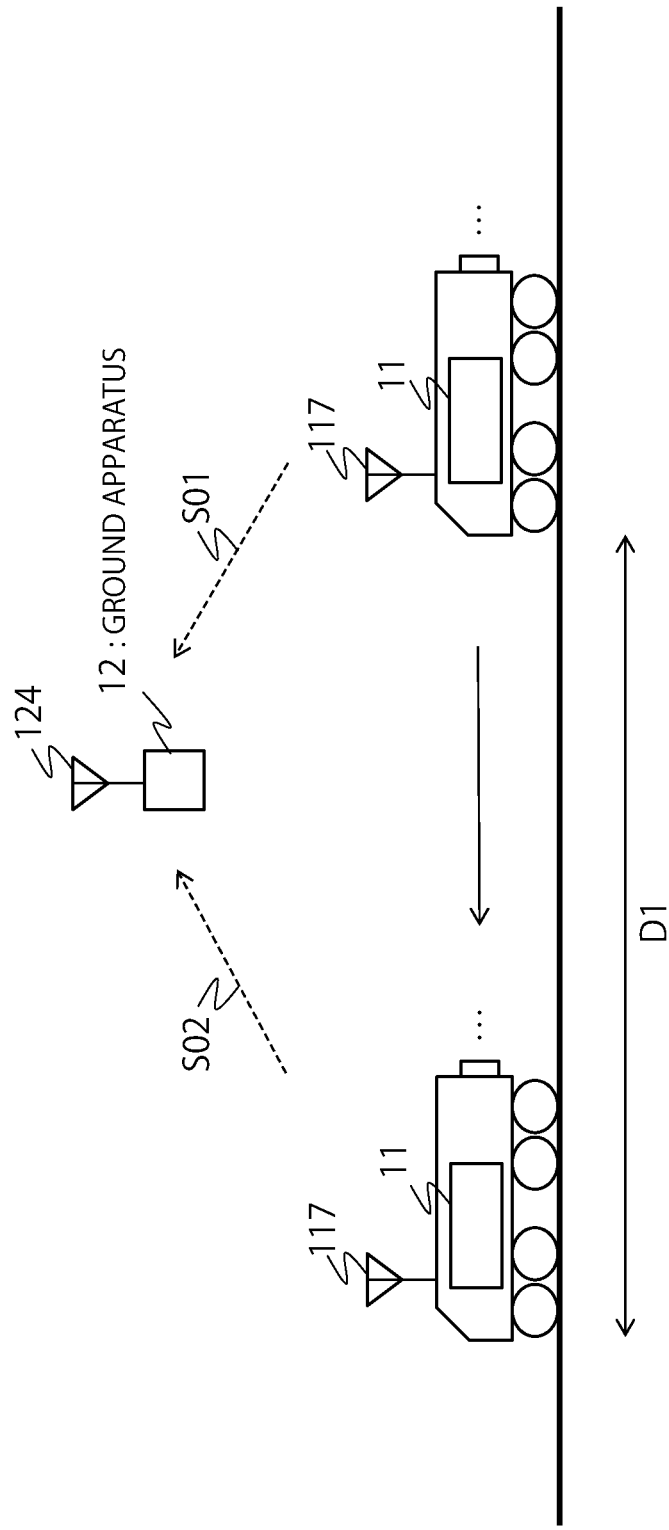
FIG. 7 is a diagram showing an example in which the ground apparatus identifies a traveling position of a train at the next time of reception.

As described above, the antenna pattern controller 125 identifies a traveling position of a train based on vehicle information from the on-vehicle apparatus 11 and determines an antenna pattern. Therefore, at the time of receiving the vehicle information from the on-vehicle apparatus 11, the traveling position of the train cannot be identified yet (because the vehicle information has not been received yet). Therefore, it is not possible to determine which antenna pattern is to be used at the time of receiving the vehicle information. Therefore, for vehicle information of the train received last, the antenna pattern controller 125 calculates a distance the train moves (advances) before receiving the next vehicle information, using a traveling speed of the train. Then, by adding the calculated distance to a current position, a traveling position of the train at the next reception can be identified. Thereby, it becomes possible to determine an antenna pattern at the next time of reception. FIG. 7 shows an example in which the ground apparatus 12 identifies a traveling position of a train at the next time of reception. A train moves a distance D1 between reception (S01) and the next reception (S02). The ground apparatus 12 calculates the distance D1 from a traveling position included in vehicle information received from the train and the traveling speed of the train. By adding the distance D1 to the traveling position, a traveling position of the train at the next time of reception is identified.

As another method, the traveling position of the train at the next time of reception may be estimated from vehicle information about the train received last to determine an antenna pattern from a relationship between the estimated traveling position and the location of the ground apparatus 12. For example, a combination of a traveling position at the last time of reception and the traveling position at the next time of reception is acquired as a sample by an evaluation survey. From a plurality of samples, a model of outputting the next traveling position, with a traveling position at the last time of reception as an input, is generated. A traveling position at the next time of reception is estimated using this model. Examples of the model include the various kinds of models stated before.

Figure 8:
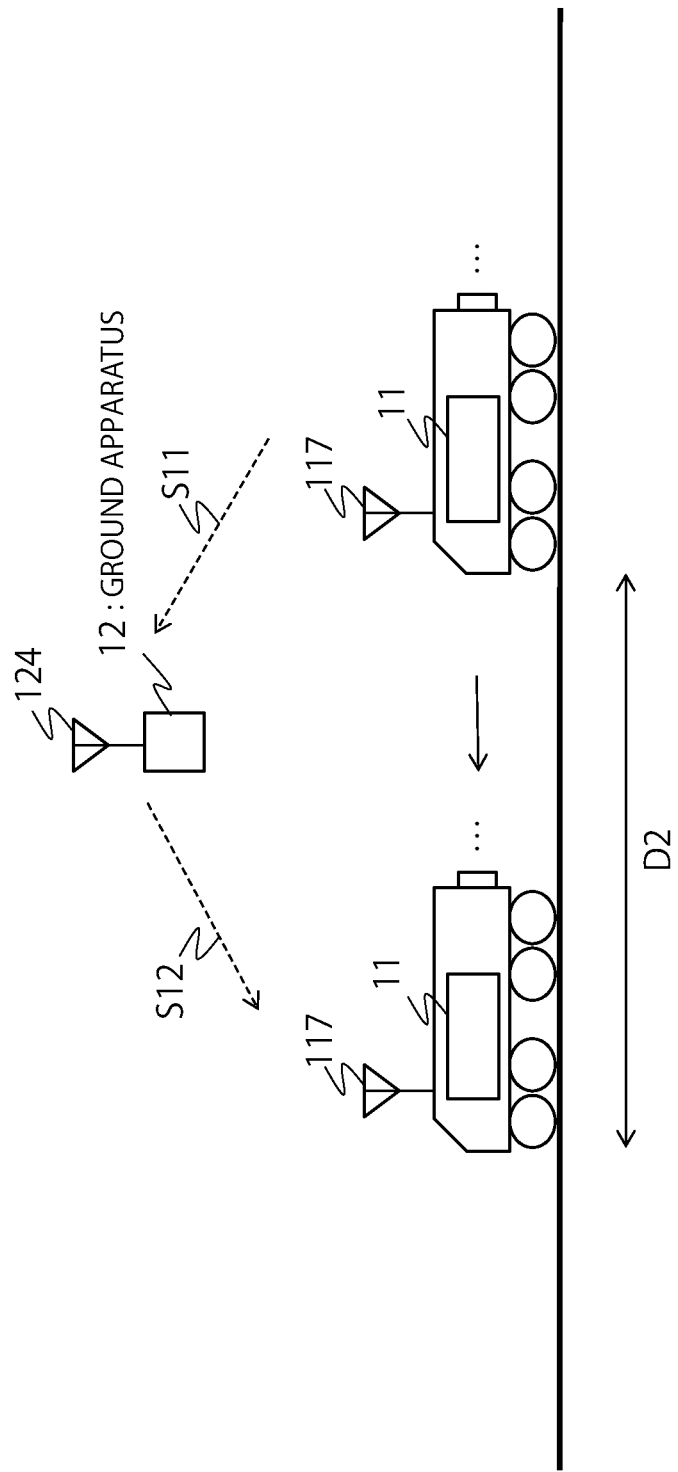
FIG. 8 is a diagram showing an example in which the on-vehicle apparatus calculates a traveling position of the train at a timing of transmission.

At the time of transmitting information from the ground apparatus 12, the train has advanced a certain distance from a traveling position shown by vehicle information received immediately before. Therefore, the traveling position of the train notified from the on-vehicle apparatus 11 is different from a (newest) traveling position of the train at the timing of performing the transmission to the train. Therefore, the ground apparatus 12 may calculate the distance the train moves between the timing of receiving the vehicle information and the transmission timing described above using the traveling speed of the train to identify a traveling position of the train at the transmission timing, based on the calculated distance. Thereby, the ground apparatus 12 can determine an antenna pattern to be used for the transmission more accurately. The ground apparatus 12 may grasp the traveling speed of the train by receiving vehicle information that includes the traveling speed from the on-vehicle apparatus 11 or may calculate the traveling speed of the train from differences among a plurality of traveling positions notified from the on-vehicle apparatus 11. FIG. 8 shows an example in which the on-vehicle apparatus 11 calculates a traveling position of a train at a timing of transmission. A train moves a distance D2 between reception (S11) and transmission (S12). The ground apparatus 12 calculates the distance D2 from a traveling position included in vehicle information received from the train (S12) and the traveling speed of the train. Then, by adding the distance D2 to the traveling position, a traveling position of the train at the transmission timing is calculated.

Further, the on-vehicle apparatus 11 may include antenna location information indicating where on the train the antenna 117 is located into train information to be transmitted to the ground apparatus 12. The antenna location information may be anything if it is information capable of uniquely identifying the location of the antenna 117. For example, the information may be information identifying a car such as "head car", information identifying a specific position with coordinates or the like, or information indicating a distance from a reference point like " . . . m from a top position of a head train". The position of the antenna 117 may be identified by a method other than the methods stated here. Thereby, the ground apparatus 12 can grasp not only the traveling position of the train but also the location of the antenna 117 on the train. Therefore, even when the traveling position of the train and the location of the antenna 117 do not correspond to each other, it is possible to accurately grasp a location (a traveling position) of the antenna 117 and appropriately determine an antenna pattern. For example, when the traveling position of the train corresponds to a position of the speed generator 111, and the antenna 117 is arranged on a backward car, the traveling position of the train and the location of the antenna 117 do not correspond to each other, but a location (a traveling position) of the antenna 117 can be identified by the method described above, and, therefore, it is possible to determine an optimal or preferable antenna pattern. Further, even when a plurality of antennas 117 are located on different cars, a location (a traveling position) of each antenna 117 can be grasped from antenna location information about each antenna 117, and, therefore, it is possible to determine an antenna pattern appropriate for each antenna 117.

As for the antenna 124 of the ground apparatus 12, a variable directivity antenna pattern may be used only in the case of transmission to each on-vehicle apparatus 11, and an ordinary omni pattern (an omni directional pattern) may be used in the case of reception from the on-vehicle apparatus 11. In this case, the antenna 124 may be arranged and designed as a transmitting antenna or a receiving antenna. Alternatively, an antenna used in common for transmission and reception may be used such that an antenna pattern control method may be switching according to whether transmission or reception. In a wireless LAN, CSMA/CA is used as an access scheme, and so-called random access control is performed. Therefore, it is not known at which timing transmission is performed by each on-vehicle apparatus 11. Therefore, the ground apparatus 12 applies the omni pattern and waits for reception so as to be able to perform reception no matter at which timing and from which train transmission is performed.

However, even in the case of using a communication scheme based on random access such as CSMA/CA, it is necessarily only one train that is a communication target of each ground apparatus 12 instantaneously, and, therefore, a communication target train may be identified. In this case, according to a traveling position of the target train, the antenna pattern controller 125 can apply a directional antenna pattern to the train to receive a signal.

Figure 9:
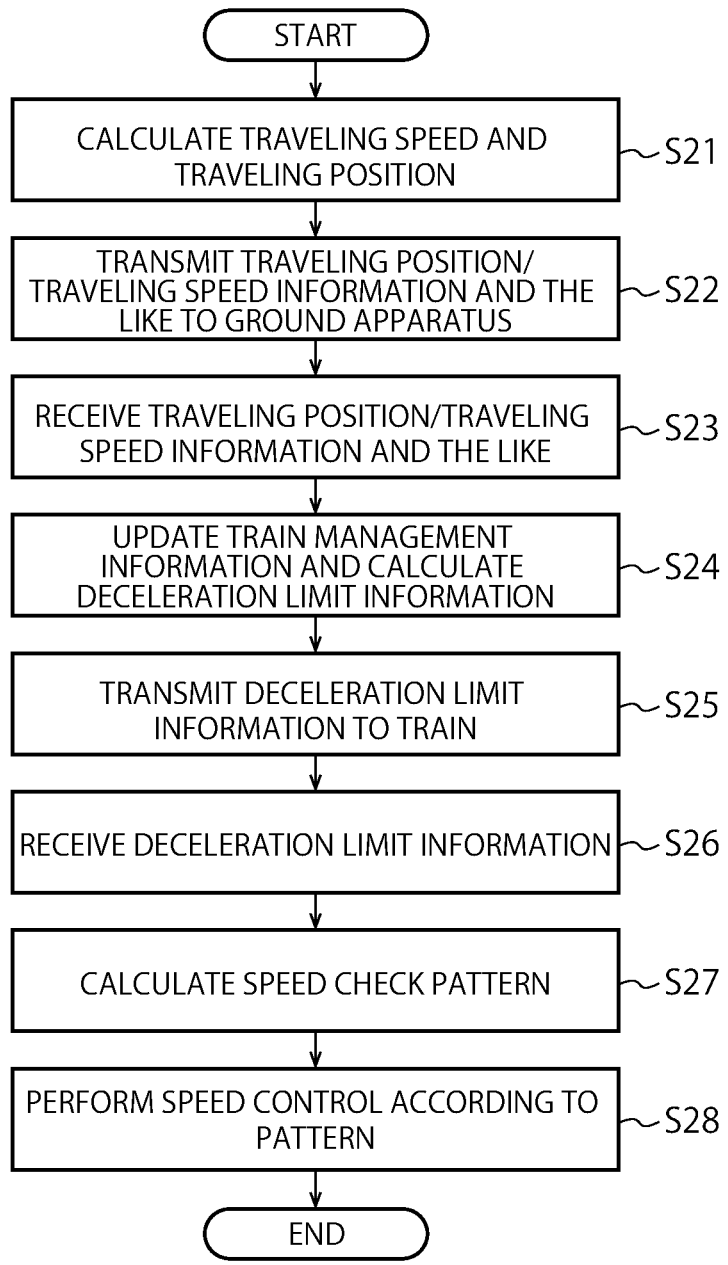
FIG. 9 is a flowchart of an example of a process of the train control system of the embodiment of the present invention.

FIG. 9 shows a flowchart of an example of a process of each on-vehicle apparatus 11 and each ground apparatus 12 in the train control system according to the embodiment of the present invention. The flow shown in FIG. 9 is started for each cycle in each train.

The calculator 112 in the on-vehicle apparatus 11 receives a speed pulse from the speed generator 111 and calculates a speed (a traveling speed) and traveling position of its own train by operation (S21).

The vehicle wireless communicator 114 transmits train information that includes the traveling position/traveling speed information obtained by the calculator 112 and detailed information about the train to the ground apparatus 12 via the antenna 117 (S22). At this time, an optimal or preferable antenna pattern is selected by the antenna pattern controller 113, and the selected antenna pattern is set for the antenna 117. As a method for the selection, the various policies stated before can be used.

From the on-vehicle apparatus 11 of each train traveling on the railroad track 13, the ground wireless communicator 121 of the ground apparatus 12 receives the train information (the traveling position/traveling speed information, the detailed information about the train, and the like) via the antennas 124 (S23). In the ground apparatus 12, at the time of the reception, an omni pattern may be set for the antennas 124, or, if a train to be a communication target can be identified, an antenna pattern having directivity relative to the train can be applied. The ground wireless communicator 121 provides the train information (the traveling position/ traveling speed information and the like) about each train to the train manager 122. The train manager 122 updates internally managed traveling position/traveling speed information and the like about each train based on the provided train information.

Each time receiving the train information (the traveling position/traveling speed information and the like) from each train, the deceleration limit information calculator 123 of the ground apparatus 12 calculates deceleration limit information (S24). The deceleration limit information means a deceleration target speed, and a deceleration target position or a deceleration target distance as stated above.

The ground wireless communicator 121 of the ground apparatus 12 transmits train control information (vehicle control information) that includes the deceleration limit information obtained by the deceleration limit information calculator 123, to the train via the antennas 124 (S25). At this time, an optimal or preferable antenna pattern is selected by the antenna pattern controller 125, and the selected antenna pattern is set for the antenna 124. As a method for the selection, the various policies stated before can be used.

After transmitting the train information (the traveling position/traveling speed information and the like) to the ground apparatus 12 at step S22, the on-vehicle apparatus 11 receives the train control information (the deceleration limit information) about its own train via the antenna 117 and the vehicle wireless communicator 114 (S26). At this time, in the on-vehicle apparatus 11, an optimal or preferable antenna pattern selected by the antenna pattern controller 113 is set for the antenna 117.

The speed check pattern generator 115 of the on-vehicle apparatus 11 creates a speed check pattern for performing control to decrease a speed to the deceleration target speed without crossing the deceleration target position notified from the ground apparatus 12 (deceleration control) based on vehicle performance (for example, braking performance) of its own train (S27).

Based on the created speed check pattern and a current traveling position and speed of its own train, the speed checker 116 judges (performs a speed check about) whether the train speed exceeds a speed indicated by the speed check pattern. If the train speed exceeds the speed, the speed checker 116 outputs a braking command to the braking controller not shown. Braking control is performed by the braking controller in accordance with the braking command (S28).

As described above, in the embodiment of the present invention, by identifying a traveling position of a moving train with high accuracy and performing communication using a directional antenna pattern, it becomes possible to improve reliability of wireless communication between an on-vehicle apparatus of the moving train and a ground apparatus. Further, the embodiment of the present invention can be also combined with a selection diversity scheme using a plurality of antennas or a time diversity scheme of performing data transmission a plurality times according to the related art. In that case, further improvement of reliability is possible.

Though description has been made with a train control system as an example in the embodiment of the present invention, the present invention can be practiced for purposes/systems other than the purpose/system for train control if wireless communication between a vehicle and a ground apparatus is involved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus mountable on a moving object, and communicable with a ground apparatus, comprising:
a first variable directivity antenna located on a first position of the moving object;
a second variable directivity antenna located on a second position different from the first position of the moving object;
controlling circuitry configured to:
acquire a traveling position of the moving object to determine the first position and the second position, determine a first antenna pattern of the first variable directivity antenna based on a location of the ground apparatus and the first position, and determine a second antenna pattern of the second variable directivity antenna based on the location of the ground apparatus and the second position; and communication circuitry configured to:

set the first antenna pattern to the first variable directivity antenna, set the second antenna pattern to the second variable directivity antenna, and transmit positional information including the traveling position or receive control information used to control the moving object from the ground apparatus via at least one of the first antenna pattern of the first variable directivity antenna or the second antenna pattern of the second variable directivity antenna, wherein the moving object is a train including a plurality of cars; and the first variable directivity antenna and the second variable directivity antenna are located on different cars of the train.

2. An electronic apparatus communicable with a second electronic apparatus mounted on a moving object, comprising:

at least one variable directivity antenna;

communication circuitry configured to receive positional information including a traveling position of the moving object from the second electronic apparatus via the variable directivity antenna; and controlling circuitry configured to determine an antenna pattern of the variable directivity antenna based on the traveling position and a location of the electronic apparatus, wherein the communication circuitry is configured to receive second positional information from the second electronic apparatus or transmit control information used to control the moving object to the second electronic apparatus via the antenna pattern of the variable directivity antenna, the controlling circuitry is configured to calculate a distance the moving object moves until next positional information is transmitted from the second electronic apparatus, based on the traveling position and a traveling speed of the moving object, and the controlling circuitry is configured to calculate a position of the moving object at which the positional information is transmitted from the second electronic apparatus next, based on the calculated distance and the traveling position, and determine the antenna pattern based on the calculated position.

3. The apparatus according to claim 2, comprising a database in which a plurality of positions and a plurality of antenna patterns are associated; wherein the controller selects an antenna pattern corresponding to the traveling position from the database and determines the selected antenna pattern as the antenna pattern of the variable directivity antenna.

4. The apparatus according to claim 2, wherein the controlling circuitry is configured to select an antenna pattern having a highest gain from among the plurality of antenna patterns.

5. The apparatus according to claim 4, wherein the controlling circuitry is configured to modify the selected antenna pattern into a different antenna pattern based on an operation condition of the moving object.

6. The apparatus according to claim 5, wherein the operation condition relates to at least one of an operation time of the moving object, an operational season and weather.

7. The apparatus according to claim 2, wherein the controlling circuitry is configured to acquire communication quality information on at least one of transmission and reception performed with the moving object with the antenna pattern and determine an antenna pattern of the variable directivity antenna using the communication quality information for same travelling position as the travelling position or for a traveling position within same range as a range to which the traveling position of the moving object belongs.

8. The apparatus according to claim 2, wherein the positional information includes a location of an antenna mounted on the second electronic apparatus; and the controlling circuitry is configured to determine the antenna pattern using the location of the antenna.

9. The apparatus according to claim 2, wherein the positional information includes the traveling speed of the moving object.

10. An electronic apparatus communicable with a second electronic apparatus mounted on a moving object, comprising:

at least one variable directivity antenna;

communication circuitry configured to receive positional information including a traveling position of the moving object from the second electronic apparatus via the variable directivity antenna; and controlling circuitry configured to determine an antenna pattern of the variable directivity antenna based on the traveling position and a location of the electronic apparatus, wherein the communication circuitry is configured to receive second positional information from the second electronic apparatus or transmit control information used to control the moving object to the second electronic apparatus via the antenna pattern of the variable directivity antenna, the controlling circuitry is configured to calculate a distance the moving object moves until the communication circuit transmits the control information, based on the traveling position and a traveling speed of the moving object, and the controlling circuitry is configured to calculate a position of the moving object at a time which the communication circuit transmits the control information, based on the calculated distance and the traveling position, and determine the antenna pattern based on the calculated position.

* * * * *